United States Patent Office 2,925,849
Patented Feb. 23, 1960

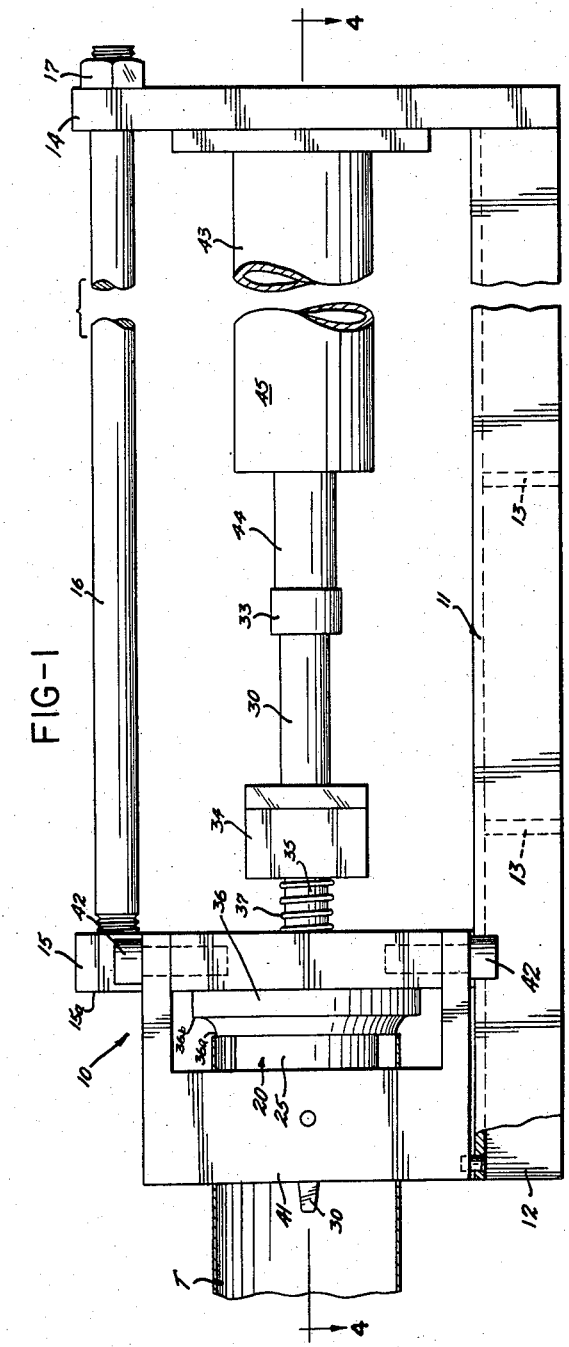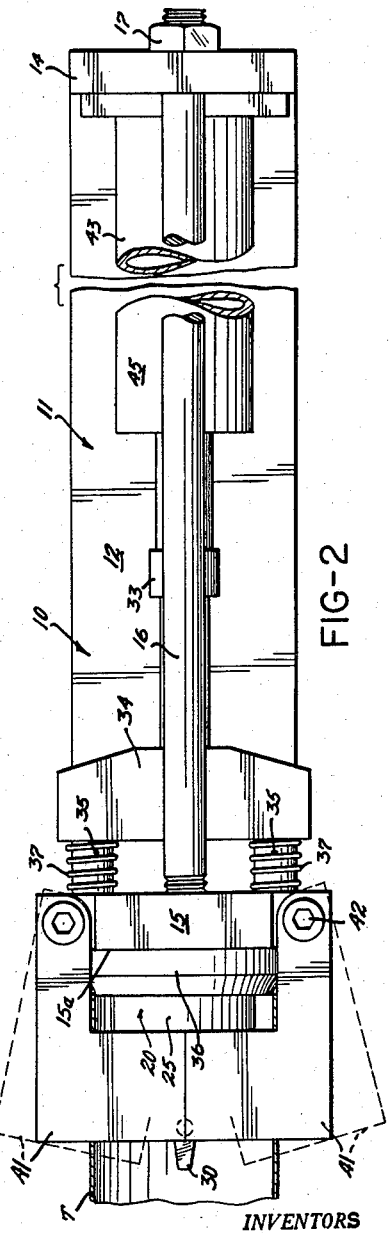
INVENTORS
Walter W. Hinz
Patrick H. Stansbury
Wayne M. Parkison
Daniel W. Boutwell

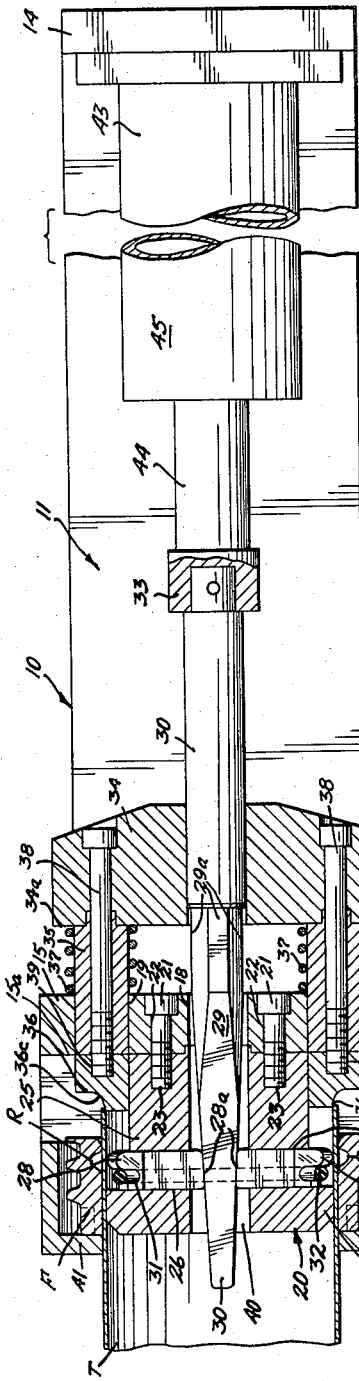

2,925,849

APPARATUS FOR INTERCONNECTING MALLEABLE TUBING AND FITTINGS THEREFOR

Walter W. Hinz, Patrick H. Stansbury, Wayne M. Parkison, and Daniel W. Boutwell, all of Spokane, Wash., assignors to Miller and Poston Manufacturing Co., Spokane, Wash., a corporation of Washington Original application November 19, 1956, Serial No. 622,998. Divided and this application December 30, 1957, Serial No. 706,183

6 Claims. (Cl. 153—79)

This is a divisional application of our copending application Serial No. 622,998 filed November 19, 1956, for Method for Interconnecting Malleable Tubing and Fittings Therefore, and the invention resides in the apparatus for interconnecting malleable tubing and fittings.

In agricultural pursuits, it is becoming more and more customary to employ water pressure systems including conduit for conveying water under pressure to multiple sprinkler heads, from which the water is discharged evenly over a given area. This is becoming the accepted manner of irrigation because it permits the agriculturalist to control the amount of water applied per acre, and provides effective means for evenly applying the water so controlled. Obviously this then provides means for conserving the water and deriving the optimum benefit from any given amount of water applied.

Pursuant to such a form of irrigation, it is desirable to employ a manually movable conduit to facilitate relocation of sprinkler heads and thus preclude an unnecessarily great number of sprinkler heads and piping for large areas such as plots where one grows row crops or pasture grasses. To accomplish this end, it has been found beneficial to provide a plurality of tube sections which may quickly and conveniently be interconnected and disconnected so that the conduit may be moved from one location to another with comparative ease for the purpose of relocating the sprinkler heads communicating with the conduit by means of standpipes associated therewith at predetermined locations along the length of the conduit.

At present, it is customary to employ lengths of tubing, for example, 20 to 40 feet in length, which are successively coupled to form a continuous conduit by means of coupling elements, some of which have standpipes associated therewith. In many instances, these coupling elements may be rigidly secured to one length of tube while they may be releasably secured to others.

There are also other occasions where thin wall aluminum tubing is desirable for use in a conduit for transmission of other fluids, such as gasses or crude oil and other such industrial uses for temporary installation. In these instances, a coupler somewhat similar to a conventional pipe union may be employed. In this regard, the elements of the fitting are secured one to the companion end of each contiguous tube, thus forming a simple but efficient way for uniting fittings to a thin wall aluminum tube. It is therefore a primary object of the present invention to provide an apparatus for securing fittings to thin wall tubing.

Further objects and advantages of the invention are to provide an apparatus for securing fittings to thin wall tubing, which apparatus is inexpensive to manufacture, is fast and efficient in its work, therefore enables one to apply fittings to thin wall tubing at a minimum of labor and expense, one which requires no additional material beyond the tube and fitting, and one which is so constructed and arranged as to avoid the likelihood of easily becoming inoperative.

In the accompanying drawings, we have disclosed one physical embodiment of the apparatus conceived by us and proven to be effective for securing fittings to thin wall tubing. It will be understood, however, that the drawings are for the purpose of setting forth to the reader a clear understanding of the invention and are not for the purpose of limitation. We therefore desire to secure to ourselves claims which broadly cover the invention and the spirit thereof and do not wish to be limited beyond the scope set forth in the claims appended hereto.

In the drawings, we have employed like numerals to designate like or similar parts, and Figure 1 is a side elevation of the improved apparatus for interconnecting malleable tubing and fittings;

Figure 2 is a top plan view of the same;

Figure 3 is an end elevation at the leftward or head end of the apparatus as seen in Figures 1 and 2;

Figure 4 is a longitudinal horizontal cross section substantially taken at line 4—4 of Figure 1;

Figure 5 is a fragmentary horizontal cross section of the head portion showing the actuated position of the driving member; and Figure 6 is a fragmentary vertical cross section of fittings secured to the ends of contiguous tubes, the fitting elements being interconnected.

Referring now in greater detail to the drawings, we have indicated the apparatus for interconnecting malleable tubing and fittings therefor in its entirety by the numeral 10. The apparatus includes a frame 11 having a longitudinally extending base member 12 which, as clearly seen in Figure 3, is made from a length of channel metal and has a plurality of laterally extending webs 13 secured therein to form a rigid inflexible base member 12.

At the rearward or rightward end of the apparatus 10 as seen in Figure 1, we provide a rear stationary member 14 which is welded or otherwise secured to the base member 11 and extends in a vertical plane disposed at right angles to the longitudinal dimension of the base member 12.

A front stationary member 15 is also secured to the base member 12 spaced rearwardly from the extreme front end thereof, and the upper ends of the front and rear stationary members 15 and 14 are secured to each other by means of a tie-rod 16 which is threadedly engaged in the front member 15 and extends through an aperture in the rear member 14 where it is provided with a cooperating nut 17 and forms a rigid frame 11.

As seen in Figure 4 of the drawing, the front stationary member 15 is provided with a plurality of openings 18 and 19—19. These openings constitute journals through which members are slidingly carried for rectilinear movement.

It will also be noted that the front stationary member 15 on its front face 15a carries a swaging head 20 secured by means of bolts 21 extending through bolt holes 22 formed through the front stationary member 15, and said bolts 21 thread into internally threaded sockets 23 formed in the swaging head 20. At its front or outer end the head 20 is provided with an annular flange 24 which is substantially the same diameter as the internal diameter of the tube T with which it is to cooperate to secure the fitting thereto. Therefore the tube fits over the flange 24 in close tolerance as shown.

Extending rearwardly from the annular flange 24 the head is provided with a reduced cylindrical extension 25 in which the internally threaded sockets 23 are formed. Swaging means are provided for swaging a tube to a fitting therefor. In the embodiment disclosed at the juncture of the annular flange 24 and the reduced cylindrical extension 25 the head is provided with radial ways 26 here shown to be four ways disposed 90 degrees from each other but which obviously may be more or less as found desirable. These ways 26 contain pressure members 27 which have cross heads constituting swaging dies 28 at their outer ends. It is thus seen that the pressure members and swaging dies are disposed for movement radially of the head with the inner end faces 28 of each pressure member disposed to contact one cam face 29 of the driving means or member 30. It is to be noticed that the swaging dies 28 of the pressure members 27 have relieved portions 31 adjacent to the swaging portions. Disposed in the relieved portions 31 we provide a resilient O ring 32, the resiliency of which urges the pressure members inwardly against the cam faces 20 of the driving member 30 to withdraw the swaging dies from the tube T after the swaging movement is completed and the driving member is withdrawn. Obviously, a coiled spring or other yieldable means may be employed to maintain the pressure members in their inward positions if desired.

It will be noted that the driving member cam faces 29 are somewhat pyramidal and terminate inwardly in axially parallel surfaces 29a so that during the initial forward movement of the driving member 30 the inner faces 28a of the pressure members 27 are contacted by the cam faces 29 and thus force the pressure members outwardly where the swaging dies swage the tube T into the recess R of the fitting F by forming depressions as shown at T2 of Figure 6 at spaced intervals about the circumference of the tube T. At the base of the pyramidal cam faces 29 the axially parallel faces 29a pass under the pressure member faces 28a and permit continued forward movement of the driving member 29 without imparting additional outward movement of the pressure member 27.

Simultaneously with the terminal movement of the driving members 30 a stop collar 33 rigidly carried by the driving member 30 contacts the cross head 34 and carries the cross head 34 forwardly therewith thus providing a lost motion connection between the driving means 30 and the flanging swage 36. Extending from the front face 34a of the cross head 34 are guide bars 35 which are axially parallel to the axis of the driving member 30 and these guide bars 35 are journaled in the journals 19 of the front stationary member 15, extend therethrough and have secured on their forward ends an annular flanging swage 36. It will be noted that the compression springs 37 disposed between that front face 34a of the cross head 34 and the rear face 15b of the front stationary member 15 encircle the guide bars 35 and bias of the cross head rearwardly to yieldably maintain the flanging swage 36 at its rearward position in face to face engagement with the front face 15a of the front stationary member 15.

The flanging swage 36 is seen to have an annular forwardly projecting wall 36a and spaced rearwardly therefrom a radially extending flat wall or shoulder 36b, the walls being interconnected by an arc at 36c sufficient to cause forward movement of the flanging swage 36 to effect a radially extending flange G on the tubing end.

It is to be noted that the tube T and its cooperating fitting F are held against axial movement by the swaging dies 28 which have depressed at spaced intervals portions T2 of the tube T into the annular recess R while the flanging swage 36 performs its step in the complete method. We thus obviate the necessity of providing clamping means for holding the tube T and therefore provide a better and more efficient method which lends itself to practice in a number of various ways including the relatively inexpensive apparatus disclosed herein.

It will be noted that the flanging swage 36 is held to the ends of the guide bars 35 by means of axially extending bolts 38 which pass through the cross head 34 and axially through the guide bars 35 and are threadably engaged in sockets 39 formed in the flanging swage. Therefore as the cross head 34 is shifted rearwardly by means of springs 37 the flanging swage 36 is also shifted rearwardly away from the flange G formed on the end of the tube.

It will also be noted that the flanging swage 36 has a close sliding engagement with the reduced cylindrical extension 25 of the head 20 and therefore it is supported in concentric relation thereto against radial displacement.

A central bore 40 extends through the head 20 in alignment with the journal 18 to admit the driving member 30 for the purpose hereinbefore described.

It will be further noted that the front stationary member 15 is provided with means for holding a fitting axially coincident with respect to the swaging means and has semi-cylindrical jaws 41 which encircle the tubing T and hold the fittings F during the swaging movement of the several parts. These jaws are pivotally supported at 42 on vertical axes so that they may be swung away to remove and insert fittings during operation of the device.

A power means 45 is supplied in the frame 11 and is here seen to comprise a cylinder 43 resting upon or supported by the rear stationary member 14. The power means 45 has a piston rod 44 disposed in axial alignment with the driving member 30 for the purpose of actuating said member through its rectilinear movements. A conventional manually controlled source of fluid under pressure (not shown) is provided for actuating the power means 45.

Having thus clearly disclosed and described our invention, we claim as new and desire to secure by Letters Patent of the United States the following:

1. A machine for interconnecting malleable tubing and fittings therefor comprising a frame including a front stationary member; a driving member; power means drivingly interconnected to impart movement to said driving member; a head rigidly carried by said front stationary member and adapted to receive in close tolerance the end portion of a tube; pressure members carried by said head and movable in predetermined paths for swaging the tube portion received by said head spaced from its marginal edge; said driving member having means operably associated with said pressure members for actuating said last named members during said movement of said driving member; and a flanging swage movable relative to said front stationary member for forming a radial flange on the end of the tube driven by said driving member for movement thereby in timed relation subsequent to the swaging movement of said pressure members.

2. A machine for interconnecting malleable tubing and fittings therefor comprising a frame including a front stationary member; a driving member; power means drivingly interconnected to impart movement to said driving member; a head rigidly carried by said front stationary member and adapted to receive in close tolerance the end portion of a tube; pressure members carried by said head; said driving member having means operably associated with said pressure members for actuating said last named members during said movement of said driving member, whereby to swage said tube to said fitting; and a flanging swage movable relative to said head for forming a radial flange on the end of the tube driven by said driving member for movement thereby in timed relation subsequent to the swaging movement of said pressure members.

3. A machine for interconnecting malleable tubing and fittings therefor comprising a frame including a front stationary member having an opening therein; a driving member adapted for rectilinear movement through said opening; power means drivingly interconnected to impart rectilinear movement to said driving member; a head rigidly carried by said front stationary member and adapted to receive in close tolerance the end portion of a tube; pressure members carried by said head and radially movable in predetermined paths for swaging the tube portion spaced from its marginal edge received by said head; said driving member having means operably associated with said pressure members for actuating said last named members during said movement of said driving member; a flanging swage movable relative to said front stationary member for forming a radial flange on the end of the tube; and a lost motion connection drivingly interconnecting said driving member and said flanging swage for movement of said swage in timed relation subsequent to the swaging movement of said pressure members, while said pressure members fix said tube against movement.

4. A machine for interconnecting malleable tubing and fittings therefor comprising a frame including a front stationary member having a plurality of journals therein; a driving member adapted for rectilinear movement through one said journal; power means drivingly interconnected to impart rectilinear movement to said driving member; a head rigidly carried by said front stationary member and adapted to enter the end portion of a tube; radially movable pressure members carried by said head and movable outwardly thereof for swaging the tube portion in which the head is disposed spaced from its marginal edge; said driving member having means operably associated with said pressure members for actuating said last named members during said movement of said driving member; a cross head spaced from said front stationary member opposed to said head; guide bars carried by said crosshead and extending axially parallel to said driving member and supported in journals in said front stationary member for rectilinear movement; a flanging swage supported on said guide bars and disposed concentric to said head initially adjacent to said front stationary member and opposed to said cross head; a stop on said driving member initially spaced from said cross head and disposed to catch and move said cross head adjacent to the end of the effective travel of said driving member, whereby the flanging swage is moved relative to said head to form a radial flange on the end of the tube in timed relation subsequent to the swaging movement of said pressure members.

5. A machine for interconnecting malleable tubing and fittings therefor, comprising a frame including a front stationary member; an elongated driving member; power means drivingly interconnected to impart movement to said driving member; a head rigidly carried by said front stationary member and adapted to receive in close tolerance the end portion of a tube; pressure members carried by said head; said driving member having pyramidal cam faces on one end thereof operably associated with said pressure members for actuating said last-named members during movement of said driving member; parallel faces on said driving member extending from the major dimension of and radially coincident to each said cam face; a flanging swage movable relative to said head for forming a radial flange on the end of the tube; said driving member being drivingly associated to drive said flange in timed relation subsequent to the swaging movement of said pressure members, whereby the said parallel faces constitute lost motion mechanisms between said driving member and said pressure members coincident to the flanging movement of said flanging swage.

6. In a machine for interconnecting malleable tubing and fittings therefor and including a frame; a head rigidly carried by said frame and adapted to enter the end portion of a tube; said head comprising a body having an annular disc at its outer end and a reduced cylindrical extension at its inner end; radially extending ways at the juncture of said disc and said extension; radially movable pressure members carried by said head and slidable in said ways; means for imparting radial movement to said pressure members, whereby to swage the end portion of a tube in which the head is disposed; a flanging swage slidingly encircling the reduced cylindrical extension of said head and movable axially thereof; and a lost motion connection drivingly interconnecting said means for imparting radial movement to said pressure members for shifting said flanging swage in timed relation subsequent to the swaging movement of said pressure members.

References Cited in the file of this patent

UNITED STATES PATENTS

| | | |
|---|---|---|
| 856,896 | McCormick | June 11, 1907 |
| 1,176,370 | Kruse | Mar. 21, 1916 |
| 1,951,833 | Maupin | Mar. 20, 1934 |
| 2,344,986 | Mothersall | Mar. 28, 1944 |
| 2,394,841 | Bugg | Feb. 12, 1946 |